(12) United States Patent
Leibowitz

(10) Patent No.: US 7,350,458 B2
(45) Date of Patent: Apr. 1, 2008

(54) HANGING ROASTER

(75) Inventor: Marc Leibowitz, Syosset, NY (US)

(73) Assignee: Lapform Products, Inc., Plainview, NY (US)

( * ) Notice: Subject to any disclaimer, the term of this patent is extended or adjusted under 35 U.S.C. 154(b) by 0 days.

(21) Appl. No.: 11/206,364

(22) Filed: Aug. 18, 2005

(65) Prior Publication Data

US 2007/0039484 A1    Feb. 22, 2007

(51) Int. Cl.
*A47J 37/00* (2006.01)
(52) U.S. Cl. .......................... 99/340; 99/400; 99/420; 99/426; 99/446; 99/449
(58) Field of Classification Search .................. 99/340; 126/337 R
See application file for complete search history.

(56) References Cited

U.S. PATENT DOCUMENTS

| | | | | |
|---|---|---|---|---|
| 77,349 | A | * | 4/1868 | Bigelow .................... 99/421 H |
| 1,741,400 | A | * | 12/1929 | Bocchino .................. 99/421 H |
| 2,580,549 | A | * | 1/1952 | Jacobson ................... 99/421 H |
| 2,654,307 | A | * | 10/1953 | Nisenson ................... 99/421 H |
| 2,821,905 | A | * | 2/1958 | Culligan ................... 99/421 H |
| 2,847,932 | A | * | 8/1958 | More ........................ 99/421 H |
| 3,266,484 | A | * | 8/1966 | Carpenter et al. ....... 126/337 R |
| 3,527,155 | A | * | 9/1970 | Renn ........................ 99/421 H |
| 3,691,937 | A | * | 9/1972 | Meek et al. .................. 99/340 |
| 4,043,260 | A |   | 8/1977 | LaPour et al. |
| 4,150,610 | A | * | 4/1979 | Ferrara ....................... 99/419 |
| 4,401,018 | A | * | 8/1983 | Berry .......................... 99/420 |
| 4,407,189 | A | * | 10/1983 | Bentson ................. 99/421 HH |
| D280,065 | S |   | 8/1985 | Pierscinski |
| 4,750,414 | A | * | 6/1988 | Dohrs ......................... 99/419 |
| 4,817,582 | A |   | 4/1989 | Oslin et al. |
| 5,064,981 | A |   | 11/1991 | Bolton |
| 5,638,742 | A |   | 6/1997 | Kassaseya |
| 6,164,194 | A |   | 12/2000 | Westmoreland |
| 6,823,773 | B2 |   | 11/2004 | Swinford et al. |
| 6,869,629 | B2 |   | 3/2005 | Tiernan |

* cited by examiner

*Primary Examiner*—Timothy F. Simone
(74) *Attorney, Agent, or Firm*—Amster, Rothstein & Ebenstein LLP

(57) ABSTRACT

A hanging roaster combines a "drip" pan, two pan-supports for suspending the pan from a rack (typically the top rack) in an oven, and at least two skewer-supports for supporting a food-carrying skewer spaced above the pan bottom and below the top rack of the oven. The pan-supports are pivotable to facilitate compact storage of the hanging roaster.

8 Claims, 5 Drawing Sheets

HANGING ROASTER

The present invention relates to a roaster for use in a conventional oven having a top rack, and more particularly to such a roaster which may be suspended from the top rack.

A conventional indoor oven, whether gas fed or electrically fed, typically defines an interior chamber in which there is at least one rack for supporting the food to be cooked, and typically a plurality of vertically spaced racks including a top rack and a bottom rack. While the oven may be used for roasting food (e.g., beef, fowl, and the like) placed on top of one of the racks, this can lead to uneven cooking of the bottom surface of the food where the bottom surface has come into contact with the transverse bars of the rack. Additionally, a pan is typically required underneath the food being roasted in order to collect any liquid and/or particulate drippings from the food so that the bottom of the interior chamber does not become soiled with baked-on drippings.

Preferably food is roasted by passing the thermally conductive prong(s) of a skewer through the food (thereby to better conduct heat into the interior of the food) with the outer or handle ends of the skewer being supported in such a manner that the all exterior surfaces of the food are equally exposed to the heat in the oven, thereby to obtain a uniform roasting of the food. Such a suspension of the food in order to allow the hot air to surround the food during the roasting is especially important in "convection" ovens which employ a forced current of hot air to cook the food.

Unfortunately, the typical oven lacks any means for supporting a food-carrying skewer such that the hot air currents can reach both the top and bottom exterior surfaces of the food.

Accordingly, it is an object of the present invention to provide a hanging roaster which combines a "drip" pan, means for supporting the pan from a rack (typically the top rack) in an oven, and means for supporting a food-carrying skewer spaced above the pan bottom and below the top rack of the oven.

Another object is to provide such a hanging roaster wherein the pan support means are pivotable to facilitate compact storage of the hanging roaster.

A further object is to provide such a hanging roaster which is simple and economical to manufacture, use, store and maintain.

SUMMARY OF THE INVENTION

It has now been found that the above and related objects of the present invention are obtained in a hanging roaster configured and dimensioned to be hung from a top rack of an oven in order to support food for roasting thereon. The roaster comprises a pan having a generally planar bottom and sidewalls upstanding therefrom for the collection of food drippings from any food being roasted, and a pair of supports, one on each of two opposed sides of the pan. Each support defines an end pivotably secured to the pan and a free end having means for releasable engaging the top rack of the oven, thereby to support the pan in the oven above the oven bottom.

Preferably each support is pivotable with respect to the pan between (i) a storage orientation substantially parallel to the pan bottom, and (II) a use orientation substantially perpendicular to and upstanding from the pan bottom.

In a preferred embodiment each support additionally defines a cooperating skewer support means for supporting a skewer above the pan, the cooperating skewer support means being disposed on the support intermediate the free end and the end pivotably secured to the pan. In use, the cooperating skewer support means support a skewer and any food thereon intermediate the top rack of the oven and the pan bottom.

In one preferred embodiment, each free end of each support defines as a releasable engaging means a transversely spaced pair of hooks. Each pair of hooks is bent, preferably in the same direction, to facilitate passage thereof between and hanging thereof on transverse bars of the top rack.

In another preferred embodiment each free end of each support defines as a releasable engaging means a single transversely extending hook. Each hook is bent, preferably in the same direction, to facilitate passage thereof between and hanging thereof on transverse bars of the top rack.

BRIEF DESCRIPTION OF THE DRAWING

The above and related objects, features and advantages of the present invention will be more fully understood by reference to the following detailed description of the presently, albeit illustrative, embodiments of the present invention when taken in conjunction with the accompanying drawing wherein.

DETAILED DESCRIPTION OF THE PREFERRED EMBODIMENTS

Figure 1:
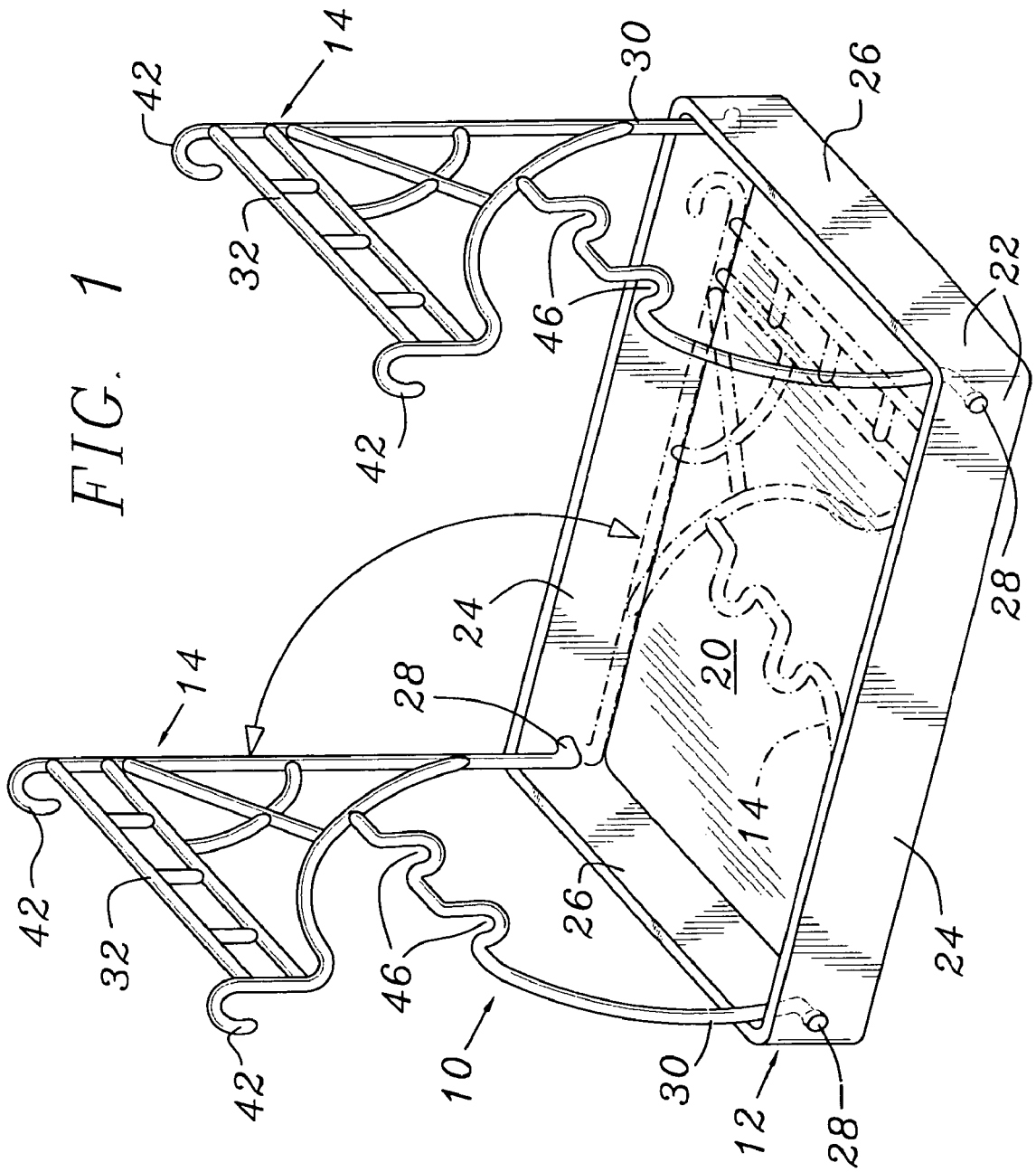
FIG. 1 is an isometric view of a first embodiment of a hanging roaster according to the present invention in its use orientation, with the pivotable lateral supports thereof also being illustrated in phantom line in a storage orientation.

Referring now to the drawing, and in particular to FIG. 1 thereof, therein illustrated is a first embodiment, generally designated by the reference numeral 10, of a hanging roaster according to the present invention. The hanging roaster 10 comprises a "drip" or roasting pan, generally designated 12, and a pair of supports, generally designated 14.

Figure 3:
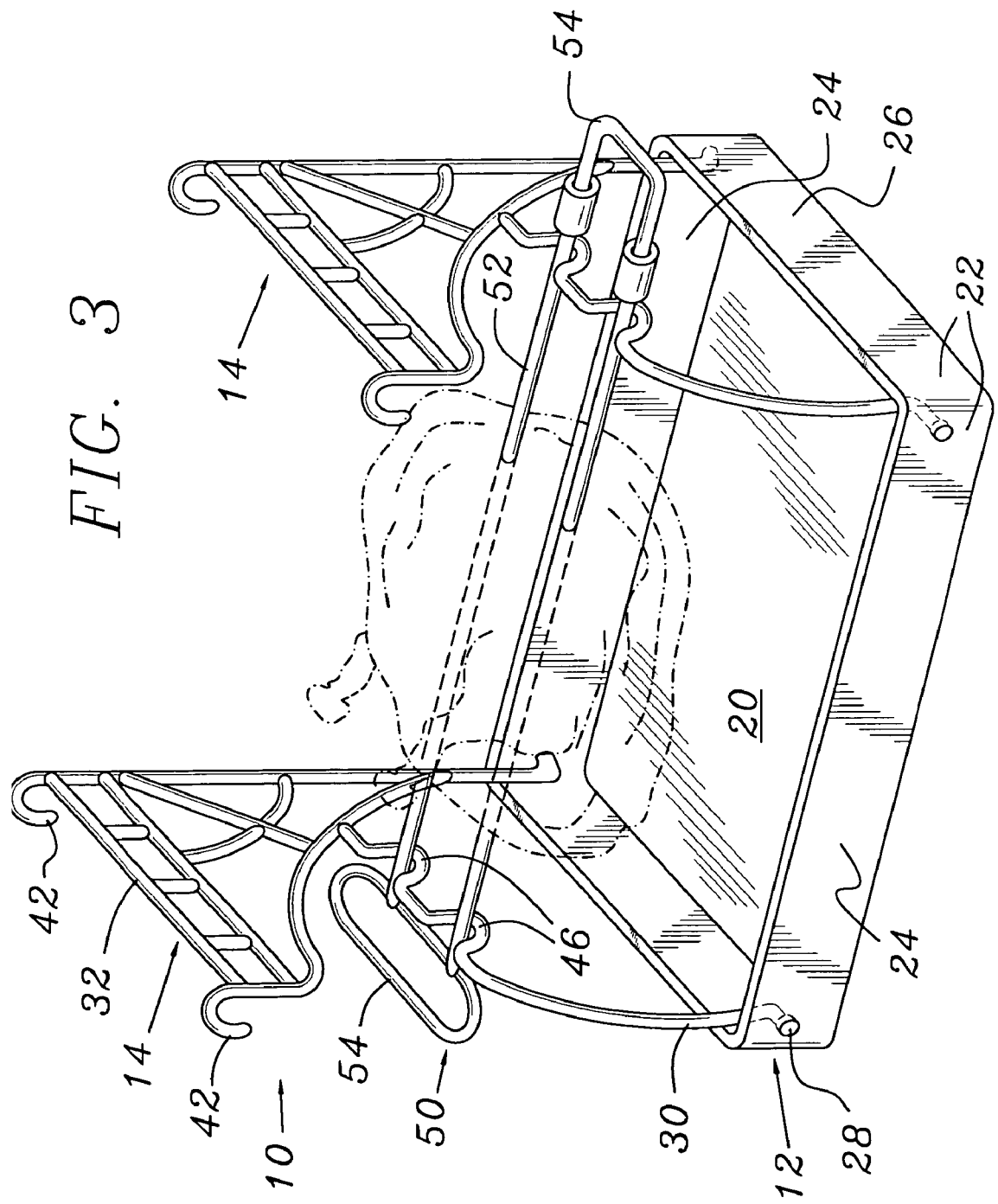
FIG. 3 is an isometric view of the hanging roaster supporting a skewer.

Referring now to FIG. 3, the hanging roaster 10 is typically used in a conventional gas or electrical oven 15, including an interior cavity 16 supporting a top rack 17 transversely slidable into and out of the cavity 16 and defining a closely-spaced plurality of transversely extending bars 18.

The pan 12 of FIG. 1 is characterized by a generally flat or planar bottom 20 and upstanding sidewalls 22, typically four sidewalls 22 for a rectangular bottom 20. The upper surface of the pan bottom 20 may include channels (not shown) for either dispersing or collecting in a given area any liquid drippings from the food being roasted Sidewalls 22 include, as illustrated, two longitudinally extending sidewalls 24 and two transversely extending lateral or end sidewalls 26. The various upstanding sidewalls 22 cooperate with the pan bottom 20 to collect liquid and/or particulate drippings from the food being roasted, thereby preventing such drippings from falling onto the bottom of the oven interior, where they might eventually become baked on. The various upstanding sidewalls 22 typically need only be about an inch in depth to contain the drippings. Generally the pan 12 may be about 6" by 12" (depending on the oven cavity dimensions).

The supports 14 are pivotably secured to the pan 12, one adjacent each of two opposed sidewalls 22 of the pan 12. Preferably each support 14 is disposed adjacent one of the lateral or end sidewalls 26 and extends almost the length of the adjacent lateral or end sidewall 26. The outwardly extending ends of each support 14 are pivotably secured at 28 to the longitudinal sidewalls 24 so that the support 14 can be easily pivoted with respect to the pan 12 between an extended use orientation substantially perpendicular and upstanding from the pan bottom 20 (illustrated in solid line) and a compact storage orientation substantially parallel to the pan bottom 20 (illustrated in phantom line). The pan bottom 20 limits pivoting of the supports 14 in one direction, while the lateral or end sidewalls 26 limit pivoting of the supports 14 in the opposite direction. While each support 14 is illustrated as including vertical and horizontal components, as well as arcuate components for added structural strength, the selection of the particular design of the support 14 may be varied—e.g., for structural, aesthetic or economic reasons—in ways obvious to those skilled in the art. Generally the height of each support 14 may be about 10" (again depending on the oven cavity dimensions).

Figure 5:
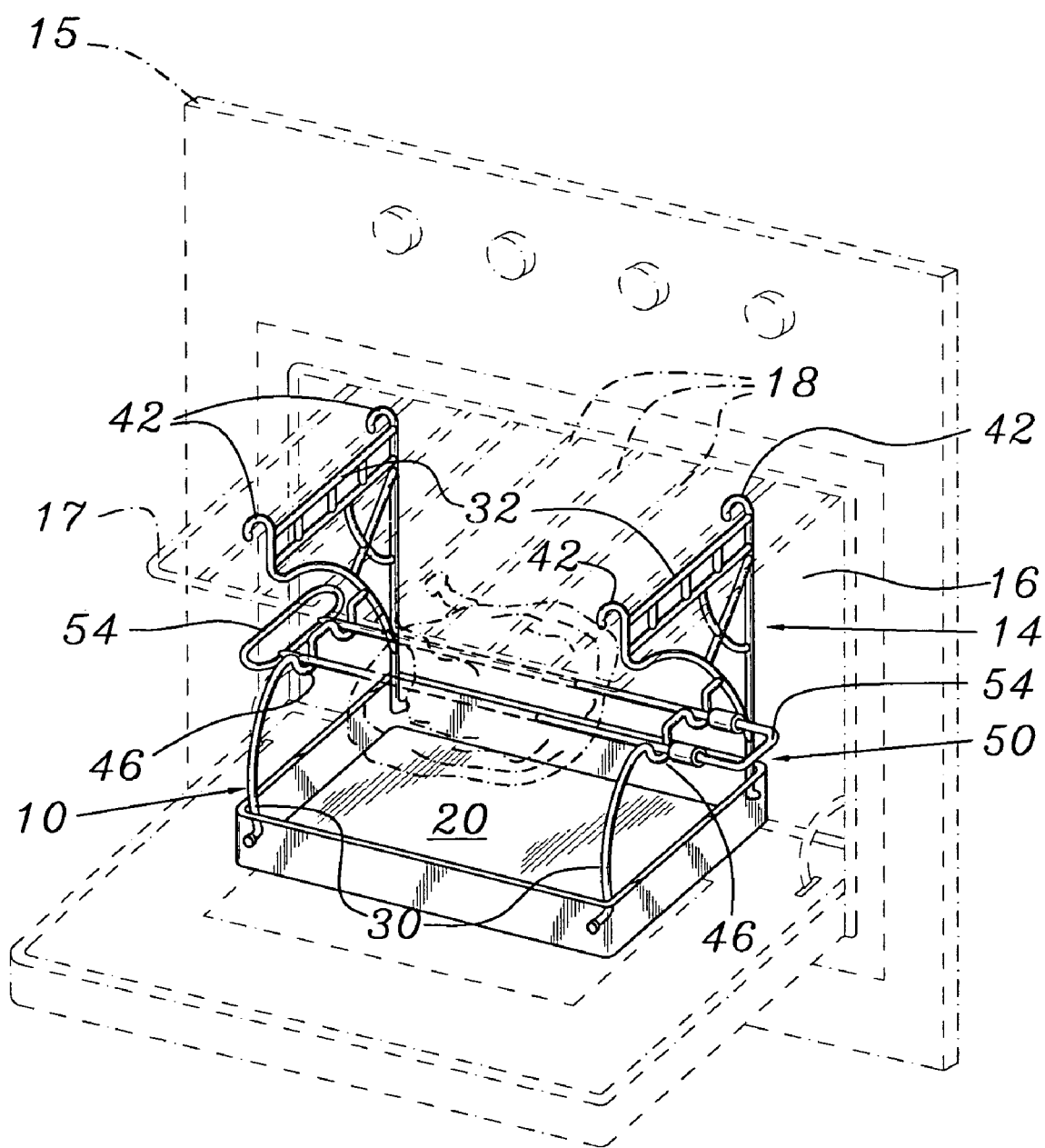
FIG. 5 is an isometric view of the hanging roaster in its use orientation, suspended from the top rack of an oven, (schematically indicated in phantom line), with a food-carrying skewer being suspended on the supports intermediate the bottom of the top rack and the top of the pan bottom.

Referring now to FIG. 5 in particular, each support 14 defines an end 30 pivotably secured to the pan 12 and a free end 32 having means 40 for releasable engaging the top rack of the oven, thereby to support the bottom of pan 12 in the oven spaced above the oven bottom. As illustrated in FIG. 1, each support free end 32 defines as the releasable engaging means a transversely spaced pair of hooks 42. Each pair of hooks 42 (one pair at each free end 32 of a support 14) is preferably bent in the same direction to facilitate passage thereof between and hanging thereof on the transverse bars of the top rack of the oven. In other words, each hook 42 must be capable of passing between the relatively closely spaced transverse bars of the top rack, thereby to allow the hook 42 to become easily suspended from one of the transverse bars, as shown in FIG. 5, and easily removed therefrom.

Figure 4:
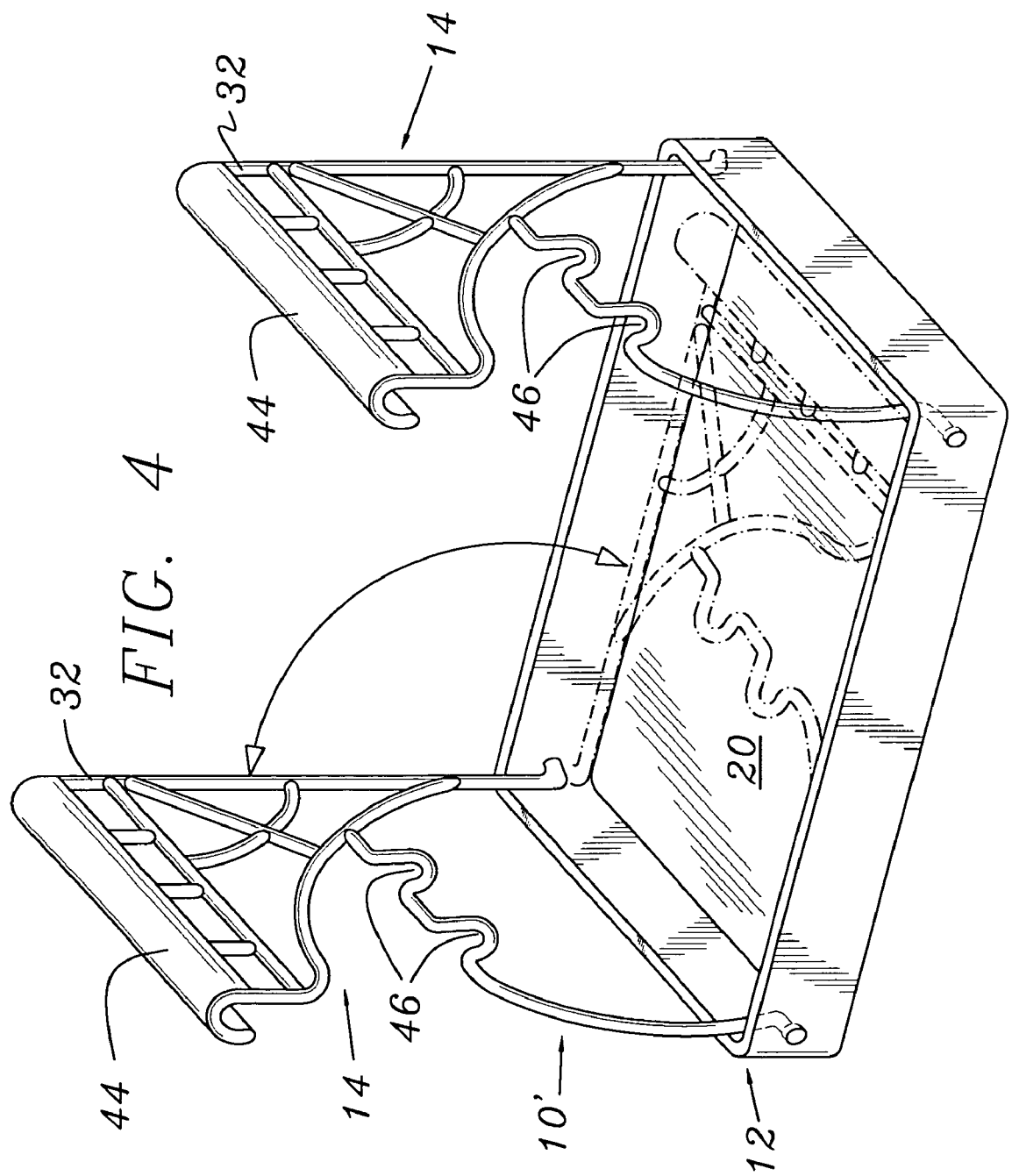
FIG. 4 is similar to FIG. 1, but showing a second embodiment of the hanging roaster.

Referring now to FIG. 4 in particular, in a second embodiment 10' each support free end 32 defines as a releasable engaging means a transversely extending single hook 44 of sufficient transverse extent that the two hooks 44, one at each support free end 32, cooperatively stabilize the pan 12 when it hangs on the transverse bars of the top rack. The two hooks 44 are preferably bent in the same direction.

Figure 2:
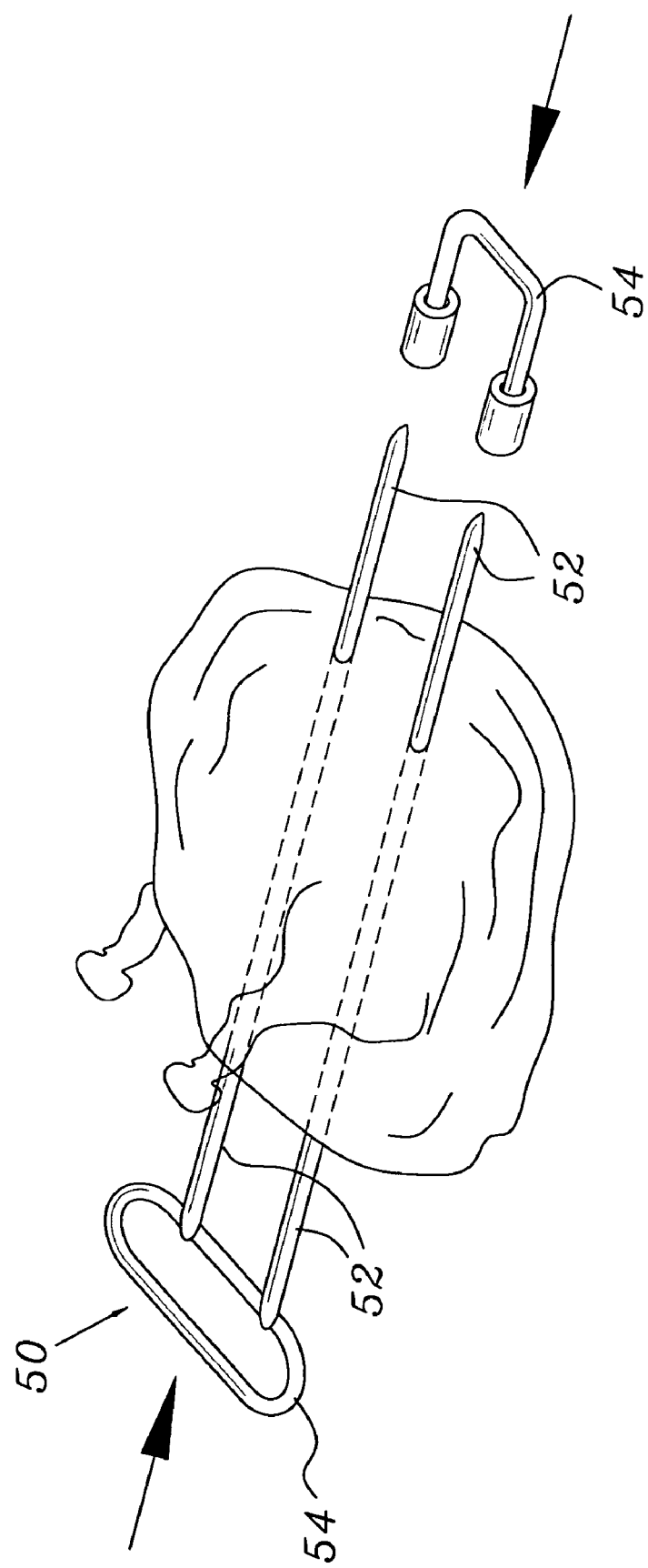
FIG. 2 is an exploded isometric view of a skewer, with a chicken thereon, for use with the hanging roaster.

A feature of the present invention is that each support 14 additionally defines at least one, and preferably two (as illustrated), cooperating skewer support means 46 for supporting a skewer, generally designated 50, above the pan 12. As best seen in FIG. 2, the skewer 50 may be of conventional design including one or two prongs 52, preferably formed of a thermally conductive material, and two handles 54, one at each end, preferably formed of a material which remains relatively cool to the touch. One of the handles 54 is removable from the sharpened ends of the prongs 52, thereby to enable the prongs 52 to be passed through the food to be roasted (after which the removed handle 54 is returned to the sharpened ends of the prongs 52). While a skewer 50 with a single prong 52 may be used, a skewer 50 with a spaced apart pair of prongs 52 is preferred both for stability of the skewer 50 (and the food carried thereon) relative to the skewer support means 46 and for stability of the food relative to the skewer 50.

Referring now to FIG. 3, the cooperating skewer support means 46 are disposed on each support 14 intermediate the free end 32 thereof and the end 30 thereof pivotably secured to the pan 12. The skewer support means 46 on each support 14 are illustrated as transversely spaced depressions adapted to receive and stabilize the two prongs of skewer 50. While the exact disposition of the skewer support means 46 on a given support 14 is a matter of design choice, preferably it is, as illustrated, midway between the ends 30, 32 so that the skewer 50 (and any food thereon) is maintained intermediate the top rack of the oven and the pan bottom 20, while being spaced from both.

FIG. 3 illustrates the food-carrying skewer 50 being placed on the skewer support means 46 in such a manner as to maintain the food spaced from both the top rack of the oven there above and the pan bottom there below. Thus, the skewer 50 supported thereon maintains the food to be roasted in a position such that all exterior surfaces of the food are generally equally exposed to the convective currents of hot air during roasting.

To summarize, the present invention provides a hanging roaster which combines a "drip" pan, means for supporting the pan from a rack (typically the top rack) in an oven, and means for supporting a food-carrying skewer spaced above the pan bottom and below the top rack of the oven. The pan supports are pivotable to facilitate compact storage of the hanging roaster when it is not in use. The hanging roaster is simple and economical to manufacture, use, store and maintain.

Now that the preferred embodiments of the present invention have shown and described in detail, various modifications and improvements thereon will become readily apparent to those skilled in the art. Accordingly, the spirit and scope of the present invention is to be construed broadly and limited only by the appended claims, and not be the foregoing specification.

I claim:

1. A hanging roaster configured and dimensioned to be hung from a top rack of an oven to support food for roasting therein, comprising:
   (A) a pan having a generally planar bottom and sidewalls upstanding therefrom for the collection of food drippings from any food being roasted, and
   (B) a pair of supports, one on each of two opposed sides of said pan, each said support defining an end pivotably secured to said pan and a free end having means for releasable engaging the top rack of the oven, thereby to completely suspend said roaster in the oven spaced above the oven bottom, each said free end defining as a releasable engaging means at least one transversely extending hook, each of said at least one hooks being bent in the same direction to facilitate passage thereof between and hanging thereof on transverse bars of said top rack.

2. The hanging roaster of claim 1 wherein each said support is pivotable with respect to said pan between (i) a storage orientation substantially parallel to said pan bottom, and (II) a use orientation substantially perpendicular to and upstanding from said pan bottom.

3. The hanging roaster of claim 1 wherein each said support additionally defines a cooperating skewer support means for supporting a skewer above said pan.

4. The hanging roaster of claim 3 wherein said cooperating skewer support means is disposed on said support intermediate said free end and said end pivotably secured to said pan.

5. The hanging roaster of claim 4 wherein, in use, said cooperating skewer support means support a skewer and any food thereon intermediate the top rack of the oven and said pan bottom.

6. The hanging roaster of claim 1 wherein each said free end defines as a releasable engaging means a transversely spaced pair of hooks.

7. A hanging roaster configured and dimensioned to be hung from a top rack of an oven to support food for roasting therein, comprising:
   (A) a pan having a generally planar bottom and four sidewalls upstanding therefrom for the collection of food drippings from any food being roasted, and
   (B) a pair of supports, one on each lateral side of said pan, each said support defining an end pivotably secured to said pan and a free end having means for releasable engaging the top rack of the oven, thereby to completely suspend said roaster in the oven spaced above the oven bottom, each said free end defining as a releasable engaging means at least one transversely extending hook;

each said support being pivotable with respect to said pan between (i) a storage orientation substantially parallel to said pan bottom, and (ii) a use orientation substantially perpendicular to and upstanding from said pan bottom;

each said support additionally defining a cooperating skewer support means for supporting a skewer above said pan, said cooperating skewer support means being disposed on said support intermediate said free end and said end pivotably secured to said pan such that, in use, said cooperating skewer support means support a skewer and any food thereon intermediate the top rack of the oven and said pan bottom.

8. The hanging roaster of claim 7 wherein each said free end defines as a releasable engaging means a transversely spaced pair of hooks.

* * * * *